(12) United States Patent
Dotzler

(10) Patent No.: US 12,109,942 B2
(45) Date of Patent: Oct. 8, 2024

(54) VEHICLE SEAT WITH UPPER PART, LOWER PART, AND LIGHT DISPLAY UNIT

(71) Applicant: GRAMMER Aktiengesellschaft, Ursensollen (DE)

(72) Inventor: Florian Dotzler, Hirschau (DE)

(73) Assignee: GRAMMER AKTIENGESELLSCHAFT, Ursensollen (DE)

(*) Notice: Subject to any disclaimer, the term of this patent is extended or adjusted under 35 U.S.C. 154(b) by 89 days.

(21) Appl. No.: 18/066,503

(22) Filed: Dec. 15, 2022

(65) Prior Publication Data
US 2023/0191989 A1   Jun. 22, 2023

(30) Foreign Application Priority Data

Dec. 17, 2021   (DE) .................. 10 2021 133 628.7

(51) Int. Cl.
| | | |
|---|---|---|
| *B60Q 3/233* | (2017.01) | |
| *B60N 2/16* | (2006.01) | |
| *B60N 2/50* | (2006.01) | |

(52) U.S. Cl.
CPC ............... *B60Q 3/233* (2017.02); *B60N 2/16* (2013.01); *B60N 2/508* (2013.01)

(58) Field of Classification Search
CPC .......... B60Q 3/233; B60N 2/162; B60N 2/16; B60N 2/508; B60N 2230/00; B60N 2002/981
See application file for complete search history.

(56) References Cited

U.S. PATENT DOCUMENTS

| | | | | |
|---|---|---|---|---|
| 5,950,977 A | * | 9/1999 | Proksch ................. | B60N 2/508 |
| | | | | 248/421 |
| 8,682,528 B2 | * | 3/2014 | Contratto ............... | B60N 2/501 |
| | | | | 701/49 |

(Continued)

FOREIGN PATENT DOCUMENTS

| | | |
|---|---|---|
| DE | 10129124 | 1/2003 |
| DE | 10354693 | 2/2005 |

(Continued)

OTHER PUBLICATIONS

Official Action with machine translation for German Patent Application No. 102021133628.7, dated Aug. 18, 2022, 7 pages.

*Primary Examiner* — Milton Nelson, Jr.
(74) *Attorney, Agent, or Firm* — Sheridan Ross P.C.

(57) ABSTRACT

The invention relates to a vehicle seat having a lower part and an upper part displaceable in a height direction relative to the lower part, the lower part and the upper part being connected to one another in a manner displaceable relative to one another by means of a connecting unit, and a height adjustment unit being provided which is intended and designed to adjust a spacing of the lower part from the upper part, wherein the vehicle seat has a light display unit comprising a light source and a deflection unit for deflecting light of the light source, the light display unit being provided and adapted to output a first light indication when the spacing of the lower part to the upper part is outside a predetermined target area and to output a second light indication when the spacing is within the target area during a first operating state of the vehicle seat.

12 Claims, 2 Drawing Sheets

(56) References Cited

U.S. PATENT DOCUMENTS

| | | | |
|---|---|---|---|
| 8,816,873 B2 * | 8/2014 | Bisset | A61H 19/30 |
| | | | 601/84 |
| 8,864,145 B2 * | 10/2014 | Haller | B60N 2/502 |
| | | | 280/124.157 |
| 2007/0228786 A1 * | 10/2007 | Greene | B60Q 3/217 |
| | | | 297/217.6 |
| 2013/0158791 A1 | 6/2013 | Contratto et al. | |

FOREIGN PATENT DOCUMENTS

| | | |
|---|---|---|
| DE | 102021103579 | 8/2022 |
| FR | 3005613 | 11/2014 |

* cited by examiner

VEHICLE SEAT WITH UPPER PART, LOWER PART, AND LIGHT DISPLAY UNIT

CROSS REFERENCE TO RELATED APPLICATION

This application claims the benefit of German Patent Application No. 10 2021 133 628.7, filed Dec. 17, 2021, the contents of which are incorporated herein by reference in their entirety.

FIELD

The invention relates to a vehicle seat having a lower part and an upper part which can be displaced in a height direction relative to the lower part, the lower part and the upper part being connected to one another in a manner which can be displaced relative to one another by means of a connecting unit, and a height adjustment unit being provided which is provided and designed for adjusting a spacing of the lower part from the upper part.

BACKGROUND

Such vehicle seats are known from the state of the art, whereby in the vehicle seats of the state of the art, an indication of whether the vehicle seat is in the correct position, i.e. that the spacing of the lower part to the upper part is in a certain range, is arranged below the upper part and is difficult to see. If a person wants to read this indication, this person has to lean forward or even get up slightly from the vehicle seat in order to be able to position the head in such a way that the indication under the upper part can be read.

Due to such a shift in weight and position, the air spring provided, by means of which the height or spacing can be adjusted, experiences a different force effect, so that a different value can be read on the display and is shown incorrectly, which can lead to an indication being shown that the vehicle seat is correctly adjusted, but this is not in fact the case.

It is therefore the object of the present disclosure to provide a vehicle seat by means of which the above-mentioned problems can be overcome.

SUMMARY

This object is solved by a vehicle seat with the features described herein.

A main idea of the present invention is to provide a vehicle seat having a lower part and an upper part displaceable in a height direction relative to the lower part, wherein the lower part and the upper part are connected to each other in a relatively displaceable manner by means of a connecting unit, and wherein a height adjustment unit is provided which is provided and adapted to adjust a spacing of the lower part to the upper part. The vehicle seat has a light display unit comprising a light source and a deflection unit for deflecting light of the light source, wherein the light display unit is provided and adapted to output a first light indication when the spacing of the lower part to the upper part is outside a predetermined target area and to output a second light indication when the spacing is within the target area during a first operating state of the vehicle seat.

Preferably, a longitudinal direction and a width direction of the vehicle seat are also provided.

The deflection unit can be selected from a deflection mirror or a deflection prism or the like. Particularly preferably, the deflection unit is arranged on the upper part and connected to the upper part.

The connecting unit can be any possible connection between the upper part and the lower part, in the sense of the present invention, i.e. in such a way that the upper part can be displaced in height direction relative to the lower part by means of the connecting unit. For example, a scissor frame, a parallelogram arrangement, or equivalent arrangements are conceivable. In particular, the connecting unit is provided and designed for displacing the upper part relative to the lower part in the height direction.

The height adjustment unit, which is intended to adjust the spacing between the upper part and the lower part, can in the usual sense be any unit that accomplishes this. Preferably, the height adjustment unit is an air spring which can be filled by a compressor when a corresponding actuating unit is actuated. Particularly preferably, each height adjustment unit comprises an actuating unit by means of which the height adjustment unit can be actuated. In particular, by actuating the height adjustment unit, the compressor is activated and/or a valve, for example a solenoid valve, is actuated so that the spacing can be adjusted.

The adjustable spacing is limited due to the mechanical design of the vehicle seat, in particular the connecting unit.

Depending on the person, i.e. their height and above all their weight, the spacing needs to be adjusted differently. The person's mass exerts a corresponding force on the upper part and the connecting unit, causing the upper part to shift. This change can be counteracted by operating the height adjustment unit and the resulting adjustment of the spacing. The spacing should lie within the target area so that an approximately equal spring travel upwards and downwards can be provided. However, this target area is designed in such a way that even a slight height shift, for example due to a person's height, can be located further within the target area. Preferably, the target area of the spacing is a middle area, i.e. the middle position of the vehicle seat, with a first area of the target area below the middle position and a second area of the target area above the middle position.

The first operating state is preferably the state in which the person is sitting on the vehicle seat, preferably in the driving position, but the vehicle seat is not subject to any further external force, for example when the vehicle is not moving. An external force would cause the upper part to move relative to the lower part and no reliable indication of the spacing would be possible. It is further preferred that the first operating state provides for an actuation of the height adjustment unit, i.e. that a light indication regarding the spacing is only output when the height adjustment unit is actuated.

In summary, the first operating condition is defined by no external force being applied to the vehicle seat, with a person sitting on the vehicle seat and during an operation of the height adjustment unit.

Particularly preferably, the light display unit is arranged on the upper part and/or the lower part. Further preferably, the display unit is arranged between the upper part and the lower part.

According to a particularly preferred embodiment, it is provided that the deflection unit deflects the light of the light source in such a way that the first light indication and the second light indication are visible in front of the vehicle seat as seen in a longitudinal direction. This means that a person sees the corresponding first indication or second indication in front of the vehicle seat and further in front of him, so that the person does not have to change his position on the vehicle seat. Particularly preferably, the light indications are visible on the floor in front of the vehicle seat so that the person only has to look down. It is also preferred that the displays can be read on a console or the like.

According to a further preferred embodiment, it is provided that the light source comprises at least one laser and/or one LED.

According to a further embodiment, it is provided that the display unit is a colour-variable light source, preferably the laser or the LED. Alternatively, the display unit is formed of a first display unit element having a first colour associated with the first light display and a second display unit element having a second colour associated with the second light display.

Preferably, the first colour and the second colour are different, for example red when the spacing is not in the target area and green when the spacing is in the target area.

According to a further preferred embodiment, it may be provided that the deflection unit is arranged at a front of the upper part with a deflection angle.

According to another preferred embodiment, the light source is arranged below the deflection unit as seen in the height direction.

Preferably, the light source and the deflection unit are arranged in relation to each other in such a way that the light from the light source can be projected by deflection onto the floor, the body bottom, the steering column or the like.

According to a preferred embodiment, it can be provided that the light source is arranged stationary. Preferably, the light source can be arranged in a fixed position relative to the lower part or a floor. By floor may be meant, for example, the body bottom or a base plate which is connected to the lower part or forms part of the lower part.

According to a further preferred embodiment, it may be provided that the light source is arranged between the upper part and the lower part and at a first distance from the lower part. The indication between the upper part and the lower part refers to the height direction. Likewise, it is envisaged that the upper part and/or the lower part completely overlap with the light source as seen in the height direction. This means that the light source is arranged in the free space between the upper part and the lower part.

Because the light source is stationary and the deflection unit is attached to the upper part, the deflection unit moves relative to the light source so that emitted light from the light source, which is preferably emitted in a certain range, can strike the deflection unit or not, depending on the position of the upper part.

Particularly preferably, it can be provided that the light source emits light with or in a general light cone, which preferably has an acute angle. If the deflection unit is arranged at the front of the upper part, the light source emits light in longitudinal direction towards the front.

Particularly preferably, the light source can emit three light cones. The three light cones are arranged in the general light cone. Preferably, a first light cone, a second light cone and a third light cone are provided, whereby the first light cone and the second light cone surround the third light cone as seen in the height direction.

Particularly preferably, the light of the first light cone and the second light cone is identical, for example red. Preferably, the light of the third light cone is different from the light of the other light cones, for example green.

According to a further preferred embodiment, it may be provided that the first light cone and the second light cone have substantially a first extension in height direction with respect to a real or imaginary projection surface formed by the height direction and the width direction, and wherein the third light cone has a second extension with respect to the projection surface.

This is accompanied by different angles of the light cones, commonly known as spread angles. The angles of the light cones are selected in such a way that the expansions are achieved as described with regard to the projection surface.

It is possible that the angles of the light cones are different or the same, depending on the orientation of the light source itself.

The first light cone and the second light cone can preferably represent the spacing outside the target area, the third light cone the spacing inside the target area, since the third light cone is arranged between the two further light cones. The first light cone and the second light cone correspond to the corresponding residual spring travel ranges of the vehicle seat.

According to a further preferred embodiment, it may be provided that the first light cone and the third light cone and the second light cone and the third light cone are spaced apart from each other as seen in the height direction. This can particularly preferably refer to the projection surface, so that a corresponding spacing between the first light cone and the third light cone as well as between the second light cone and the third light cone can be seen on the projection surface.

Such a spacing is therefore not shown in colour so that the person in the vehicle seat can see that the end of the target area has been reached and can react accordingly before a position outside the target area is taken.

According to a particularly preferred embodiment, the projection surface can be formed by a bellows or the like. Preferably, a bellows element is provided which is firmly connected to the upper part and the lower part. Preferably, the bellows surrounds the upper part and the lower part in longitudinal direction and/or width direction. Further preferably, the bellows element has a light exit opening in a front and upper region. Through the light exit opening, it is possible for light from the light source, which is arranged between the upper part and the lower part, to emerge from the bellows, which preferably surrounds the upper part and the lower part, and to strike the deflection unit.

According to a further preferred embodiment, it may be provided that the light display unit is deactivated during a second operating state of the vehicle seat.

The second operating state can be defined as the state when the first operating state is not present. For example, this is during a driving operation. During driving, an output by the display unit would be disturbing to the person.

Preferably, the connecting unit may be implemented by a scissor frame comprising at least one fixed bearing and at least one floating bearing, the floating bearing being able to move in longitudinal direction upon displacement of the upper part relative to the lower part. Preferably, the scissor frame comprises a first scissor arm and a second scissor arm, wherein preferably the first scissor arm and the second scissor arm each comprise a floating bearing and a fixed bearing. Further preferably, the first scissor arm is connected to the upper part by means of a floating bearing and to the lower part by means of a fixed bearing.

Further preferably, the second scissor arm is connected to the upper part by means of a fixed bearing and to the lower part by means of a floating bearing. Further preferably, the scissor arms are connected to each other so as to be rotatable about an axis of rotation.

The task is also solved by a method for outputting a position of an upper part to a lower part of a vehicle seat, comprising the method steps:
a) Actuating the height adjustment unit;
(b) Activation of the light display unit when the height adjustment unit is operated if the vehicle seat is in the first operating state;
c) Displaying the first light indication when the spacing of the lower part to the upper part is outside a predetermined target area, or displaying the second light indication when the spacing is within the target area.

Further advantageous embodiments result from the dependent claims.

BRIEF DESCRIPTION OF THE DRAWINGS

Further aims, advantages and usefulness of the present invention can be found in the following description in conjunction with the drawing. Hereby show.

DETAILED DESCRIPTION

In the figures, identical components are to be understood with the corresponding reference signs. For the sake of clarity, some components may not have a reference sign in some figures, but have been designated elsewhere.

Figure 1:
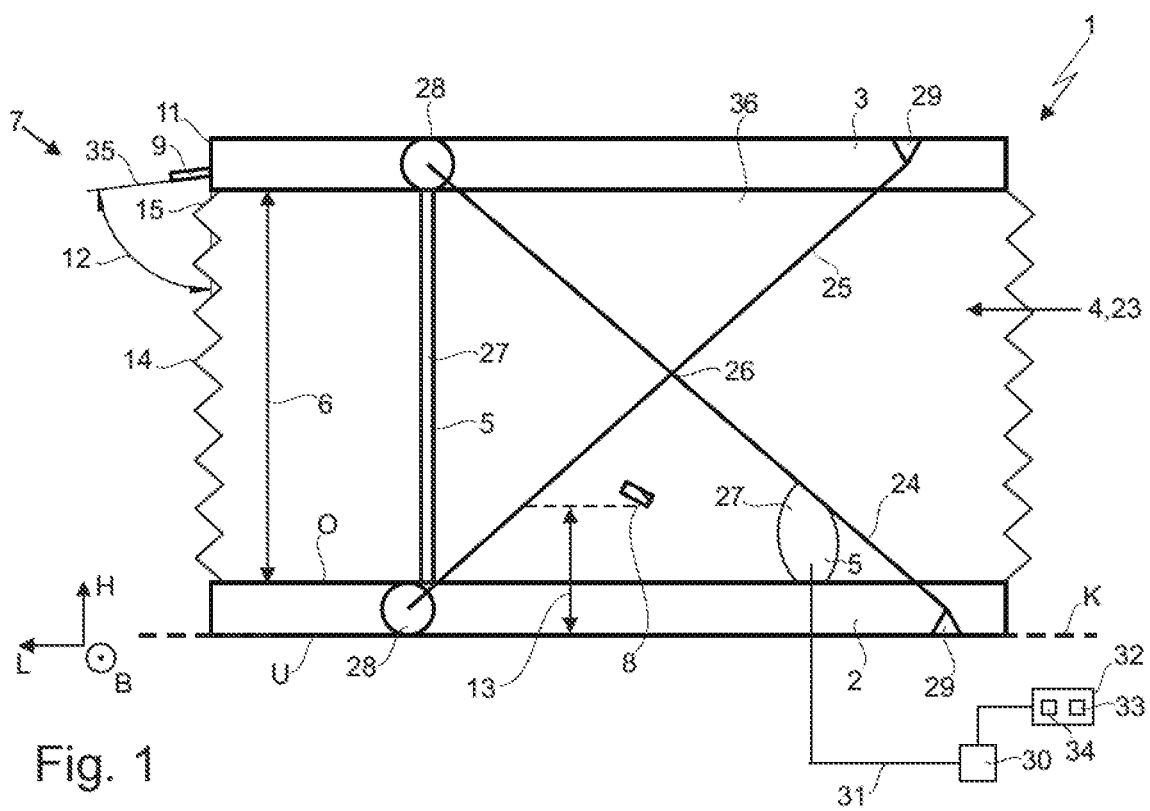
FIG. 1 schematically shows a vehicle seat according to one embodiment.

FIG. 1 shows the vehicle seat 1 schematically, whereby further elements such as seat cushions, backrests and the like have been omitted. The vehicle seat 1 can be arranged on a body bottom K and connected to it.

The vehicle seat 1 comprises a lower part 2 and an upper part 3, the lower part 2 and the upper part 3 being arranged at a spacing 6 from one another. The upper part 3 is arranged displaceably in height direction H relative to the lower part 2 by means of a connecting unit 4 and is connected to the lower part 2 by means of the connecting unit 4.

According to the embodiment of FIG. 1, the connecting unit 4 is designed as a scissor frame 23, whereby the scissor frame 23 comprises a first scissor arm 24 and a second scissor arm 25. The scissor arms 24, 25 are rotatably connected to each other about an axis of rotation 26. The first scissor arm 24 is connected to the upper part 3 by means of a floating bearing 28 and to the lower part 2 by means of a fixed bearing 29. The second scissor arm 25 is connected to the lower part 2 by means of a floating bearing 28 and to the upper part 3 by means of a fixed bearing 29. Other arrangements and assignments of bearings and scissor arms are also conceivable.

The spacing 6 between the upper part 3 and the lower part 2 can be changed by means of a height adjustment unit 5. The spacing 6 refers to a spacing 6 when no force is acting on the vehicle seat 1. If a force is applied, the upper part 3 is displaced relative to the lower part 2 and the spacing 6 changes accordingly.

The height adjustment unit 5 is provided and designed to adjust the spacing 6 of the upper part 3 to the lower part 2. For example, the height adjustment unit 5 is designed as an air spring 27 which is fluidically connected to a compressor unit 30, whereby the compressor unit 30 is designed and intended to fluidically fill the air spring 27. The air spring 27 and the compressor unit 30 are fluidically connected by means of a connecting line 31.

According to FIG. 1, various possibilities for the arrangement of the height adjustment unit 5 are shown. For example, it is conceivable that the air spring 27 is arranged between the upper part 3 and the lower part 2 and is connected to them. It would also be conceivable to arrange the air spring 27 between the scissor frame 23 and the upper part 3 or the lower part 2. It would also be conceivable to provide several air springs 27 and to arrange each of them according to one of the possibilities described.

Furthermore, an actuating unit 32 can be provided, which is connected to the compressor unit 30 at least in terms of signals. In this case, the actuating unit 32 can comprise a first switching element 33 for "up" and a second switching element 34 for "down", so that actuation of the actuating unit 32 and the first switching element 33 triggers the compressor unit 30 in such a way that the air spring 27 is filled, and actuation of the actuating unit 32 and the second switching element 34 triggers the compressor unit 30 in such a way that the air spring 27 is emptied.

Likewise, the actuating unit 32 provides a signal to a power source (not shown here) which is designed and configured to provide a voltage or current to the light display unit 7.

Provision of voltage is preferably provided when the actuating unit 32 is actuated. By providing a voltage or current to the light display unit 7, the light source 8 emits light accordingly.

The light source 8 is preferably arranged at a first spacing 13 from the lower part 2 or the body bottom K. Preferably, the first distance 13 can refer to an upper side O and a lower side U of the lower part 2.

The light source 8 is stationary in relation to the lower part 2. This means that the light source 8 is independent of the movement of the upper part 3.

Furthermore, the light display unit 7 comprises a deflection unit 9, whereby the deflection unit 9 is designed as a deflection mirror 9. In the following, the terms deflection unit and deflection mirror are used synonymously.

Preferably, the deflection mirror 9 is arranged on a front side 11 of the upper part 3 with a deflection angle 12. The deflection angle 12 is described as the angle between the plane formed by the height direction H and the width direction B, and the extension 35 of the deflection mirror 9 in the longitudinal direction L.

In order to be able to achieve a display on the body bottom K or other components, arranged below the person, it is provided that the deflecting mirror 9 is arranged in height direction H above the light source 8. If this were not the case, it would no longer be possible to deflect the light downwards by means of the deflecting mirror 9.

Further preferably, a bellows element 14 is provided which is connected to the upper part 3 and the lower part 2. The bellows element 14 surrounds at least the intermediate space 36 formed between the upper part 3 and the lower part 2.

The bellows element 14 also has a light exit opening 15 so that light can be directed through the bellows 14 to the deflecting mirror 9. By providing the bellows element 14, stray light, which can be perceived as disturbing, can be minimised.

The operation of the vehicle seat 1 according to the invention is described in connection with the further figures.

Figure 2:
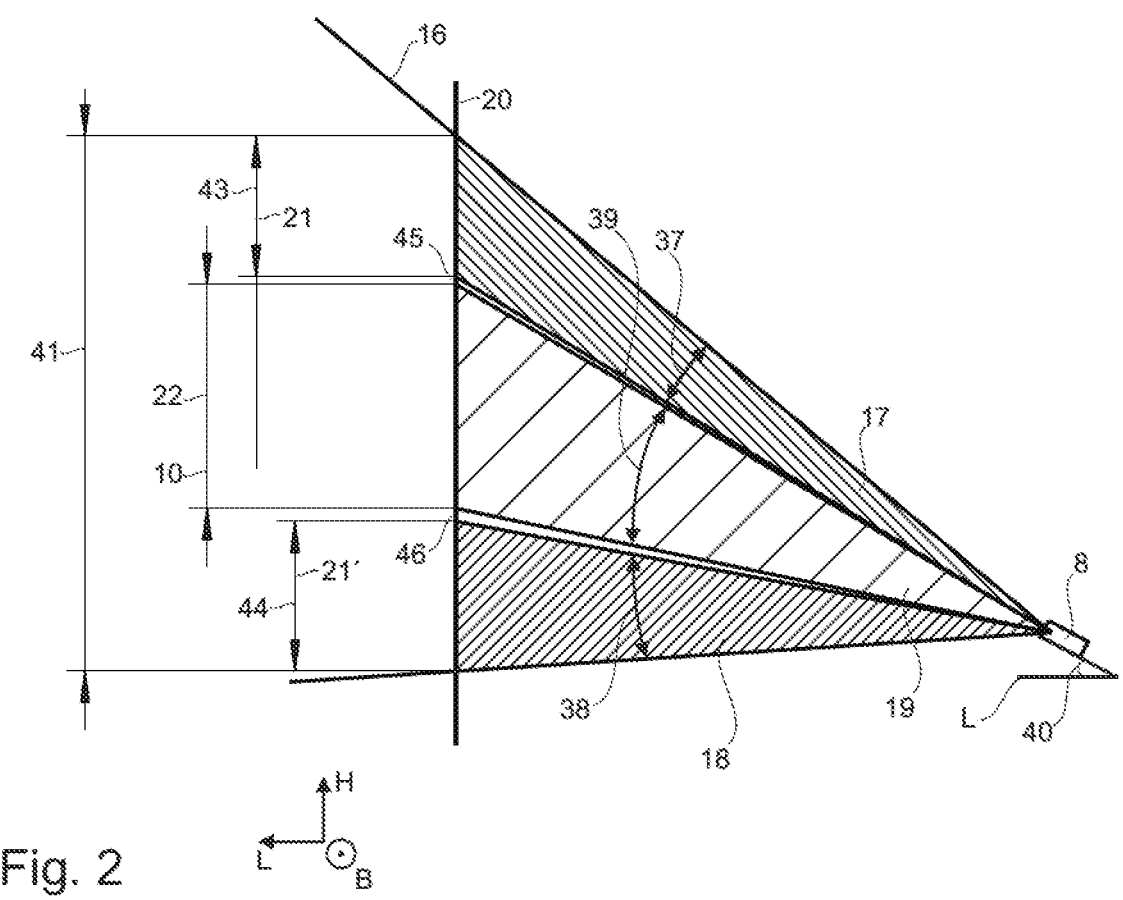
FIG. 2 a schematic representation of the functional principle.

FIG. 2 shows the light source 8 and the emission of light schematically.

The light source 8 is preferably arranged at an arrangement angle 40 to the longitudinal direction L. Particularly preferably, the arrangement angle 40 is an acute angle.

The light source 8 emits light in the form of a general light cone 16. Preferably, the general light cone 16 is divided into a first light cone 17 with a first spread angle 37, a second light cone 18 with a second spread angle 38 and a third light cone 19 with a third spread angle 39.

The light from the light source 8 is incident on a projection surface 20, which is formed by the width direction B and the height direction H. The projection surface 20 can be represented by the bellows element 14.

With regard to the projection surface 20, the first light cone 17 has a first extension 21, the second light cone 18 has a third extension 21' and the third light cone 19 has a second extension 22. Preferably, the first extension 21 and the third extension 21' are substantially the same.

The arrangement of the light source 8 and the spread angles 37, 38, 39 are selected in such a way that the extensions 21, 21', 22 correspond to the target area 10 or the residual spring travels 43, 44, i.e. the first extension 21 corresponds to an upper residual spring travel 43, the second extension 21' corresponds to a lower residual spring travel 44 and the second extension corresponds to the target area 10. For example, the target area 10 can correspond to 80 mm, and the residual spring travels 43, 44 can each correspond to 50 mm.

A total adjustment travel 41 of the vehicle seat 1 is also shown.

As can be seen further, the light cones 17, 18, 19 are spaced from each other in height direction H, i.e. a spacing can be seen on the projection surface 20 between the respective light cones 17, 18, 19. More precisely, a first spacing 45 is provided between the first light cone 17 and the third light cone 19 and a second spacing 46 is provided between the second light cone 18 and the third light cone 19.

These spacings 45, 46 mark the transitions between the target area 10 and the residual spring travels 43, 44.

The first light cone 17 and the second light cone 18 are preferably assigned a first colour, for example red. The third light cone 19 is preferably assigned a second colour, for example green. The colour differentiation can be used to indicate in which area the spacing 6 is located.

Figure 3A:
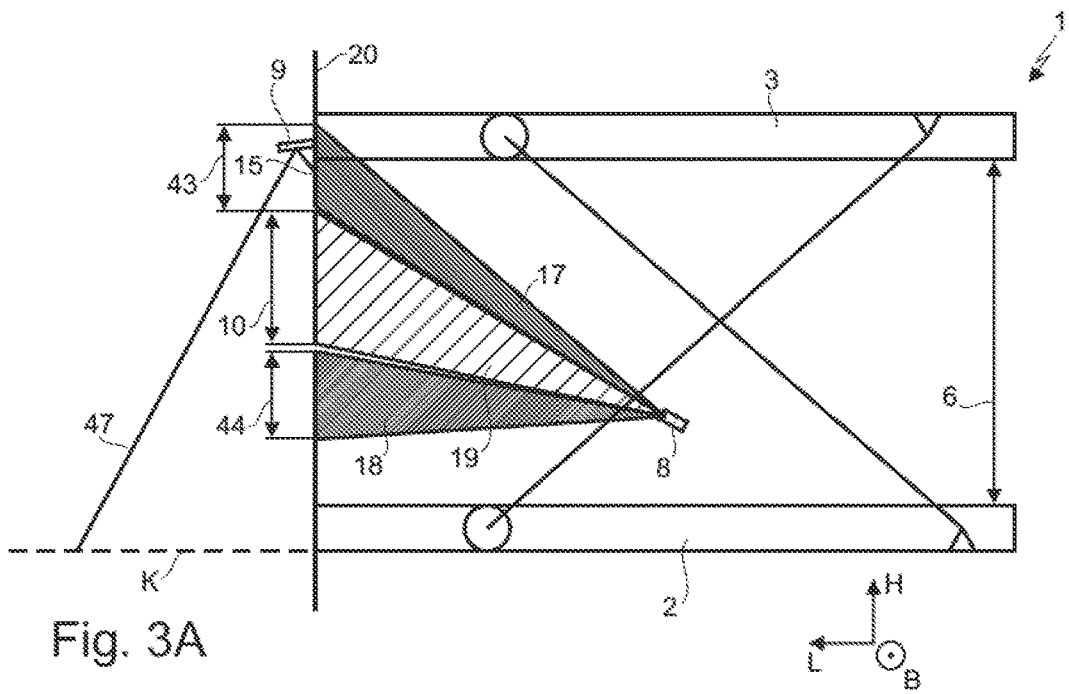
FIG. 3A schematically shows a vehicle seat with too large a spacing.
Figure 3B:
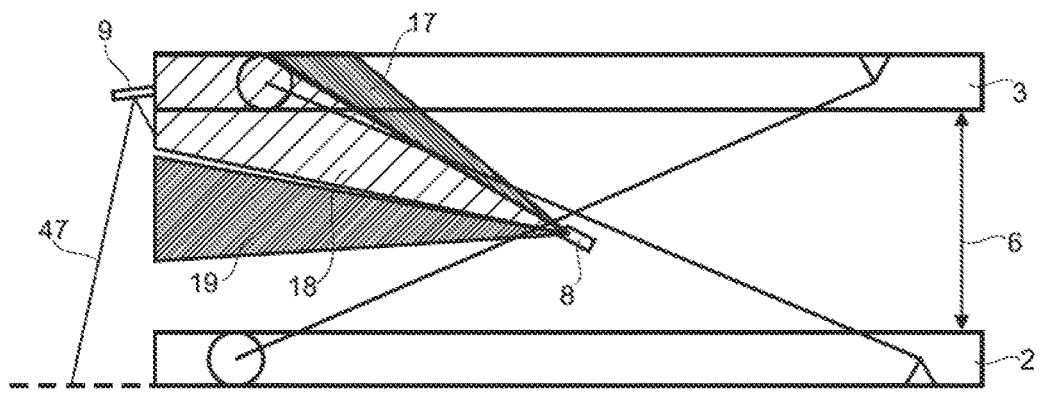
FIG. 3B Schematic of a vehicle seat with spacing in the target area.
Figure 3C:
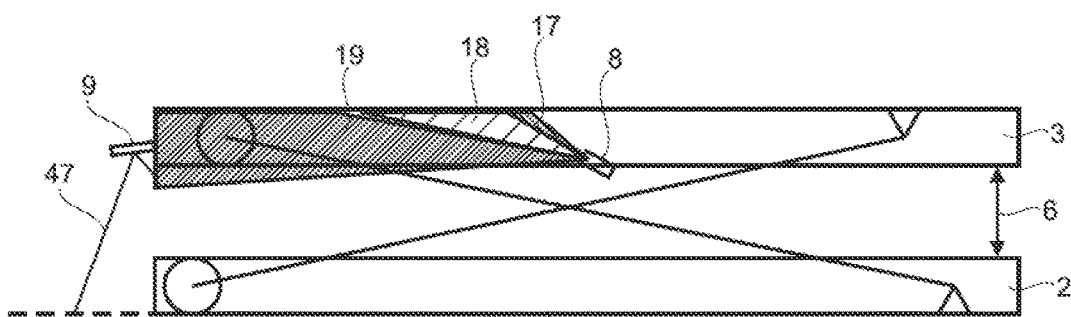
FIG. 3C schematic of a vehicle seat with an excessive spacing.

According to FIGS. 3A, 3B and 3C, different spacings 6 of the upper part 3 to the lower part 2 are shown and the corresponding indication of the light from the light source 8.

According to FIG. 3A, the spacing 6 is set too high so that the light beam 47 coming out of the light exit opening 15, which originates from the first light cone 17, hits the deflecting mirror 9 and displays a corresponding indicator or light indication on the body bottom K. The person recognises the corresponding colour, for example red, and therefore knows that the vehicle seat 1 is not in the target area 10.

According to FIG. 3B, a correct spacing 6 is set, i.e. the spacing 6 is in the target area 10. Accordingly, it is therefore the case that the light beam 47 emerging through the light exit opening 15, which originates from the third light cone 19, impinges on the deflecting mirror 9 and displays a corresponding indicator or light indication on the body bottom K. The person recognises the corresponding colour, for example green, and therefore knows that the vehicle seat 1 is in the target area 10.

According to FIG. 3C, the spacing 6 is set too small so that the light beam 47 coming out of the light exit opening 15, which originates from the second light cone 18, hits the deflecting mirror 9 and displays a corresponding indicator or light indication on the body bottom K. The person recognises the corresponding colour, for example red, and therefore knows that the vehicle seat 1 is not in the target area 10.

All features disclosed in the application documents are claimed as essential to the invention, provided that they are individually or in combination new compared to the prior art.

LIST OF REFERENCE SIGNS

1 Vehicle seat
2 Lower part
3 Upper part
4 Connecting unit
5 Height adjustment unit
6 Spacing
7 Light display unit
8 Light source
9 Deflection unit
10 Target area
11 Front of upper part
12 Deflection angle
13 first distance
14 Bellows element
15 light exit opening
16 general light cone
17 first light cone
18 second light cone
19 third light cone
20 projection surface
21 first extension
21' third extension
22 second extension
23 scissor frame
24 first scissor arm
25 second scissor arm
26 axis of rotation
27 air spring
28 floating bearing
29 Fixed bearing
30 compressor unit
31 Connecting line
32 Actuating unit
33 First switching element
34 Second switching element
35 Extension
36 intermediate space
37 first spread angle
38 second spread angle
39 third spread angle
40 Arrangement angle
41 Adjustment range
43 upper residual spring travel
44 lower residual spring travel
45 first spacing
46 second spacing
47 light beam
U lower side
O upper side
K Body bottom
H Height direction
L Longitudinal direction
B Width direction

The invention claimed is:
1. A vehicle seat, comprising:
a lower part; and an upper part which can be displaced in a height direction relative to the lower part, the lower part and the upper part being connected to one another in such a way that they can be displaced relative to one another by means of a connecting unit, and a height adjustment unit being provided which is intended and designed for a purpose of adjusting a spacing between the lower part and the upper part, wherein the vehicle seat has a light display unit comprising a light source and a deflection unit for deflecting light from the light source, the light display unit being provided and designed to output, during a first operating state of the vehicle seat, a first light indication when the spacing of the lower part from the upper part is outside a predetermined target area, and to output a second light indication when the spacing is within the target area.

2. The vehicle seat according to claim 1,
wherein the deflection unit deflects light from the light source in such a way that the first light indication and the second light indication are visible in front of the vehicle seat as seen in a longitudinal direction.

3. The vehicle seat according to claim 1,
wherein the light source comprises at least one laser and/or one LED.

4. The vehicle seat according to claim 1,
wherein the deflection unit is arranged at a front of the upper part with a deflection angle.

5. The vehicle seat according to claim 1,
wherein the light source is arranged stationary with respect to the lower part or a base.

6. The vehicle seat according to claim 1,
wherein the light source is arranged between the upper part and the lower part and at a first distance from the lower part.

7. The vehicle seat according to claim 1,
wherein a bellows element is provided which is fixedly connected to the upper part and the lower part and which has a light exit opening in a front and upper region.

8. The vehicle seat according to claim 1,
wherein the light source emits three light cones, a first light cone and a second light cone enclosing a third light cone as seen in the height direction.

9. The vehicle seat according to claim 8,
wherein the first light cone and the second light cone have substantially one extension in the height direction with respect to a real or imaginary projection surface formed from the height direction and a width direction, and wherein the third light cone has a second extension with respect to the projection surface.

10. The vehicle seat according to claim 8,
wherein the first light cone and the third light cone, and the second light cone and the third light cone are spaced apart as seen in the height direction.

11. The vehicle seat according to claim 1,
wherein the light display unit is deactivated during a second operating state of the vehicle seat.

12. A method for outputting a position of an upper part to a lower part of a vehicle seat according to claim 1, comprising the method steps:
a) actuation of the height adjustment unit;
b) activation of the light display unit when the height adjustment unit is operated if the vehicle seat is in the first operating state; and
c) displaying the first light indication when the spacing of the lower part to the upper part is outside a predetermined target area, or displaying the second light indication when the spacing is within the target area.

* * * * *